United States Patent [19]
Billheimer

[11] Patent Number: 5,943,849
[45] Date of Patent: Aug. 31, 1999

[54] CROP STALK GUIDE CUTTERBAR ATTACHMENT EXTENSION

[76] Inventor: Dee L. Billheimer, 44495 Country Road J, Haswell, Colo. 81045

[21] Appl. No.: 08/998,919

[22] Filed: Dec. 29, 1997

[51] Int. Cl.$^6$ .................................................. A01D 45/02
[52] U.S. Cl. ................................. 56/119; 56/298; 56/309; 56/312
[58] Field of Search .............................. 56/119, 298, 303, 56/305, 307, 304, 312, 308, 309, 310, 311

[56] References Cited

U.S. PATENT DOCUMENTS

| | | | |
|---|---|---|---|
| Re. 2,594 | 5/1867 | Wheeler, Jr. ................................ | 56/309 |
| 353,233 | 11/1886 | Royce ........................................ | 56/309 |
| 1,239,570 | 9/1917 | Crawford ................................... | 56/309 |
| 1,258,740 | 3/1918 | Blocki ....................................... | 56/312 |
| 1,815,491 | 7/1931 | Braasch et al. ........................... | 56/312 |
| 1,945,301 | 1/1934 | Wilson ...................................... | 56/309 |
| 2,053,741 | 9/1936 | Rousch ..................................... | 56/312 |
| 2,187,438 | 1/1940 | Wilcox ...................................... | 56/313 |
| 2,577,939 | 12/1951 | Wannebo .................................. | 56/309 |
| 2,795,922 | 6/1957 | Home ........................................ | 56/257 |
| 2,816,412 | 12/1957 | Fisher ....................................... | 56/119 |
| 3,579,967 | 5/1971 | Schumacher .............................. | 56/313 |
| 3,881,305 | 5/1975 | Burrough .................................. | 56/257 |
| 4,267,689 | 5/1981 | Schneider et al. ........................ | 56/53 |
| 4,630,430 | 12/1986 | Weeks ...................................... | 56/14.1 |
| 4,750,321 | 6/1988 | Klein ........................................ | 56/310 |
| 4,909,026 | 3/1990 | Molzaan et al. .......................... | 56/298 |
| 5,105,610 | 4/1992 | Britten ...................................... | 56/298 |

FOREIGN PATENT DOCUMENTS

| | | |
|---|---|---|
| 23045 | 5/1925 | Australia . |
| 21792 | 7/1945 | Australia . |
| 5960 | 5/1966 | Australia . |
| 26461 | 8/1967 | Australia . |
| 43403 | 9/1968 | Australia . |
| 101 618 | 2/1965 | Denmark ................................ 56/312 |
| 3 904 350 | 8/1990 | Germany ................................ 56/119 |

*Primary Examiner*—H. Shackelford
*Attorney, Agent, or Firm*—Flanagan & Flanagan; John K. Flanagan; John R. Flanagan

[57] ABSTRACT

A crop stalk guide cutterbar extension for use on a crop stalk guide attachment to a crop gathering header cutterbar includes a plurality of mounting bars, guide bars and braces which provide a plurality of assembled units for mounting to and forwardly of the crop stalk guide attachment. Each assembled unit of the extension is formed by one of the mounting bars, one of the guide bars and one of the braces. Each mounting bar is attached to and extends forwardly from a support framework of the crop stalk guide attachment and each guide bar overlies one mounting bar and has a forward end attached on a leading end of the mounting bar. The guide bar is supported by one of the braces disposed between the guide bar and corresponding mounting bar to extend inclined upwardly and rearwardly from the forward end to a rearward end overlying and spaced above a leading end of one of the guide plates of the crop stalk guide attachment. The guide bars and mounting bars of the assembled units together define forward elongated passageways running in the direction of forward travel across the field surface and leading rearwardly to rearward elongated passageways of the crop stalk guide attachment for raising and guiding crop stalks which are flattened on the field surface upwardly to the crop stalk guide attachment.

20 Claims, 3 Drawing Sheets

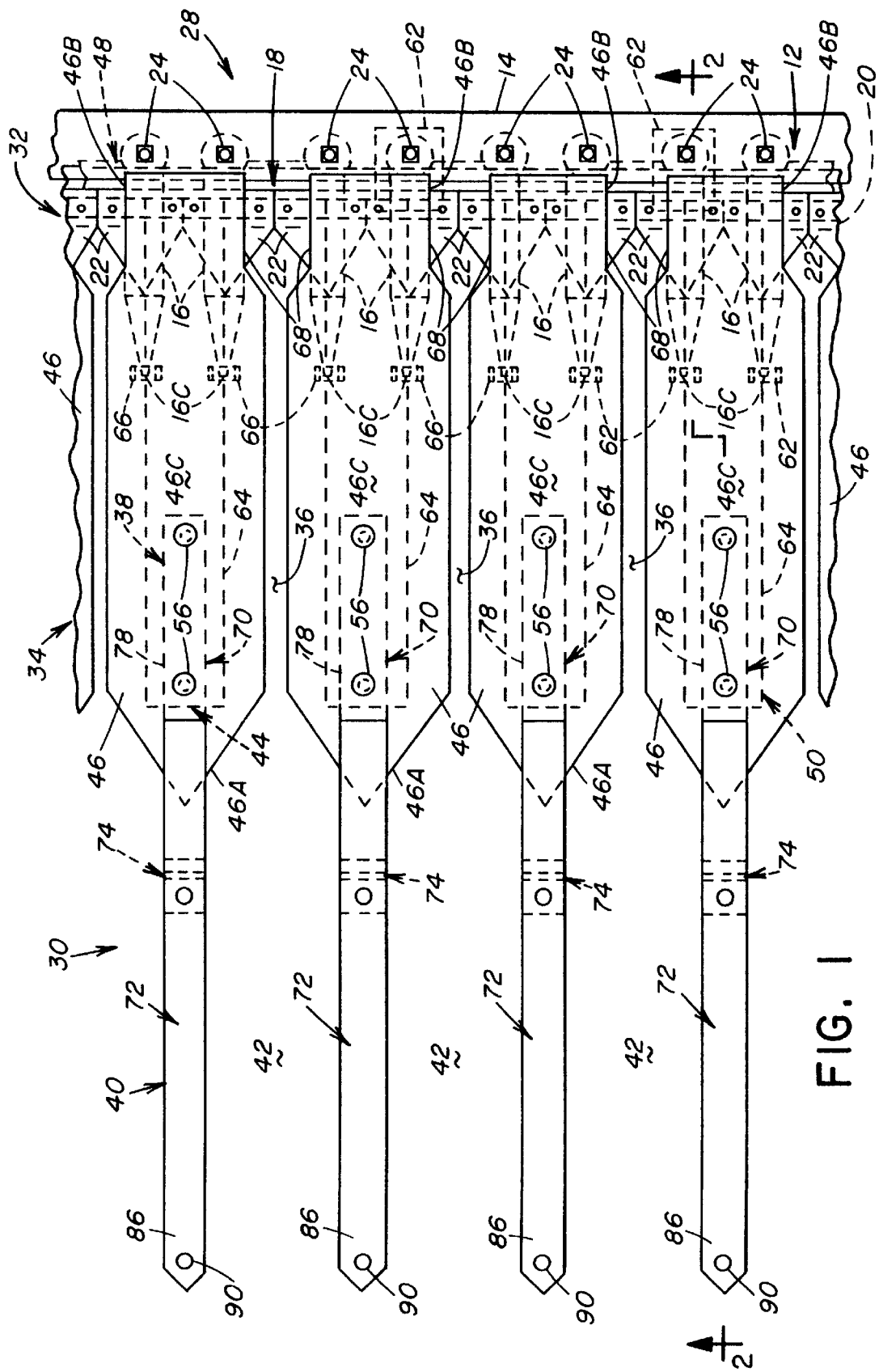

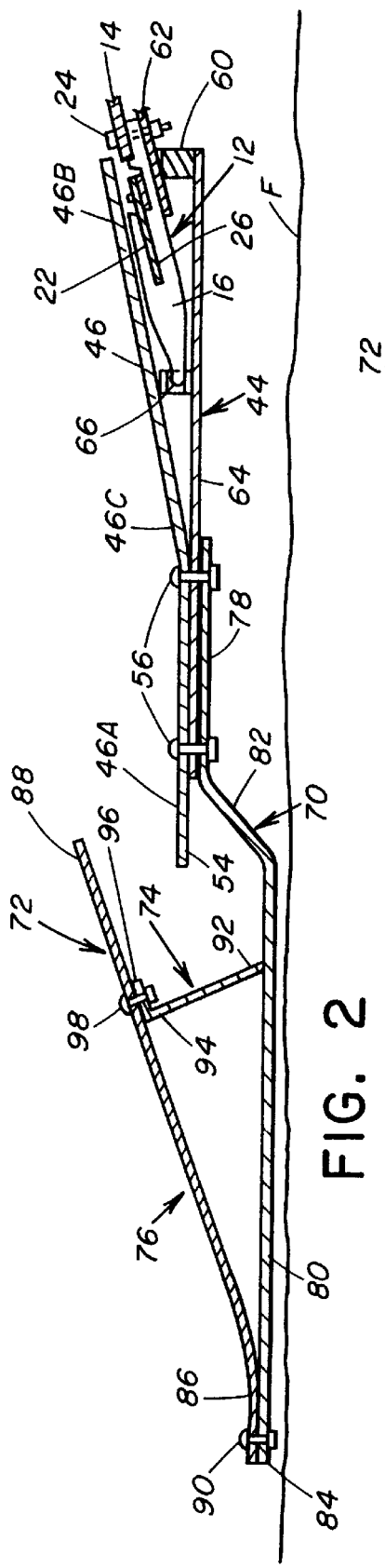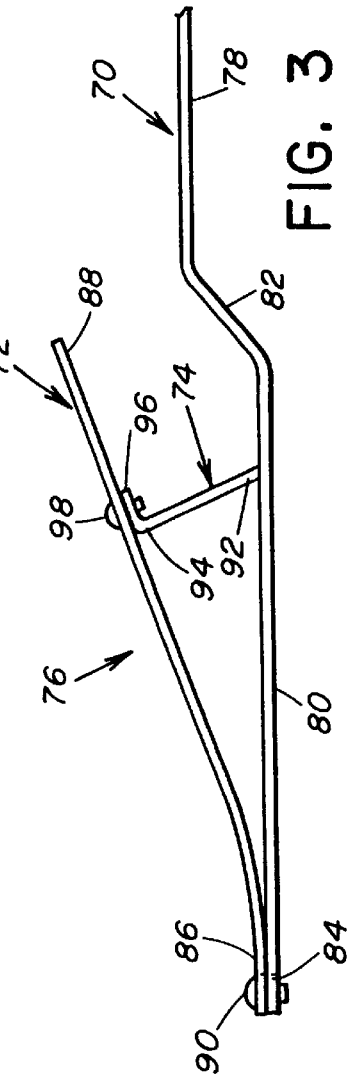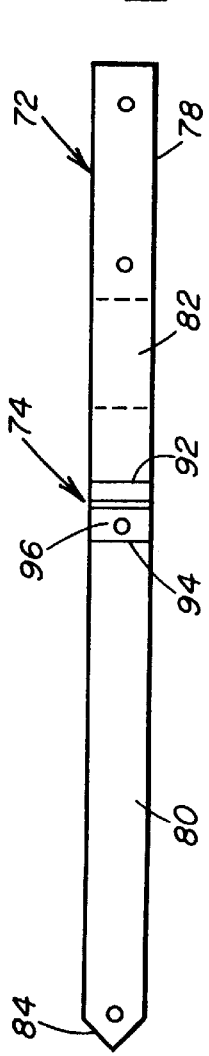

CROP STALK GUIDE CUTTERBAR ATTACHMENT EXTENSION

BACKGROUND OF THE INVENTION

1. Field of the Invention

The present invention generally relates to crop harvesting equipment and, more particularly, is concerned with a crop stalk guide extension for employment with a crop stalk guide attachment to a cutterbar of a crop harvesting machine gathering header.

2. Description of the Prior Art

Crop harvesting machines, such as combines, are commonly used to gather and harvest grain-bearing stalk crops as the machine is moved across the field. In the case of short stalk row crops, such as soybeans and milo, the crop harvesting machine gathers the crop by cutting the stalks close to the ground and feeding the severed grain-bearing stalks into the machine. The machine harvests the grain from the stalks by first threshing the severed stalks and finally separating the grain from the threshed stalks.

Crop harvesting machines typically utilize crop headers mounted transversely across their forward ends to cut and gather a wide swath of the crop upon each pass through the field. The crop gathering headers commonly employ cutterbars extending transversely to the path of movement of the machine through the field and positioned close to the ground for severing the crop stalks close to the ground.

Crop gathering headers also usually employ devices for guiding the crop stalks into the cutterbars. The particular guide device employed depends on what crop is being harvested. One type of stalk guide device, which has been used for short stalk row crops, such as milo, is constructed of a number of rod-like fingers which attach to the cutterbar and extend forwardly on opposite sides of the stalk rows. At their forward ends, the fingers, in turn, mount springy tines which extend rearwardly on opposite sides of the stalk rows.

Problems have been encountered with this type of stalk guide device that impede the overall efficiency of harvesting operations. First, under certain tangled crop conditions, the tines can break off and be pulled into the cutterbar causing damage which requires temporary shutdown of the harvesting machine until repairs are made. Second, weeds intermingled with the crop stalks tend to catch on and plug the guide fingers, eventually impeding the smooth flow of the crop stalks to the cutterbar and requiring temporary suspension of the harvesting operation until the plugged weeds are cleaned out.

A solution to these problems in guiding crop stalks into the cutterbar of a crop harvesting machine gathering header has been provided by the crop stalk guide cutterbar attachment disclosed in U.S. Pat. No. 5,105,610 issued to Britten. The Britten crop stalk guide assembly includes a support framework and a plurality of flat guide plates. The support framework is attachable to the cutterbar of the crop gathering header so as to extend forwardly from below the sickle guards and a sickle of the cutterbar and to be spaced above the field surface the same as the cutterbar. The flat guide plates are attached on the top of a forward portion of the support framework so as to extend above the cutterbar sickle guards and sickle. The guide plates are spaced laterally in relation to one another and define elongated passageways between them which run in the direction of forward travel and lead rearwardly between the sickle guards to the sickle of the cutterbar.

The patented Britten crop stalk guide cutterbar attachment has heretofore performed satisfactorily under most crop conditions and thus has provided a solution to the aforementioned problems. However, a problem may still arise under certain extreme conditions wherein certain crop stalks are bent down so low to the ground that they pass under the attachment and the cutterbar.

Consequently, a need has arisen for an improvement to the design of the Britten attachment for guiding crop stalks into the cutterbar of the crop harvesting machine gathering header.

SUMMARY OF THE INVENTION

The present invention provides a crop stalk guide assembly designed to satisfy the aforementioned need. The crop stalk guide assembly of the present invention provides a crop stalk guide extension for employment with the aforementioned crop stalk guide attachment to the cutterbar of the crop harvesting machine gathering header. The crop stalk guide extension is adapted for use in extreme conditions wherein certain crop stalks are too low to the ground to be engaged and guided the crop stalk guide attachment alone. The crop stalk guide extension assists the crop stalk guide attachment in guiding low crop stalks rearwardly and upwardly into the cutterbar without experiencing plugging and breakage problems.

Accordingly, the present invention is directed to a crop stalk guide assembly for use on a crop gathering header cutterbar disposed a predetermined elevation above a field surface and having a row of laterally-spaced forwardly-extending sickle guards and a sickle composed of a row of blade sections reciprocally movable laterally through the sickle guards and cooperable therewith to sever crop stalks from the field surface. The crop stalk guide assembly of the present invention comprises: (a) a crop stalk guide attachment having a rear portion attachable to the header cutterbar and a front portion extending forwardly from the rear portion, the rear and front portions together defining rearward elongated passageways beginning forwardly of the cutterbar at substantially the predetermined elevation of the cutterbar and running in the direction of forward travel across the field surface and leading rearwardly to between the sickle guards to the sickle of the cutterbar for guiding crop stalks on the field surface to the cutterbar and terminating over the cutterbar above the predetermined elevation thereof; and (b) a crop stalk guide extension having a rearward portion attachable to the crop stalk guide attachment and a forward portion extending forwardly from the rearward portion and below the crop stalk guide attachment, the rearward and forward portions together defining forward elongated passageways beginning forwardly of and below the crop stalk guide attachment at an elevation below the predetermined elevation of the cutterbar and the crop stalk guide attachment and adjacent to the field surface and running in the direction of forward travel across the field surface and leading rearwardly to the rearward elongated passageways for guiding crop stalks on the field surface to the crop stalk guide attachment and terminating at an elevation above and over the front portion of the crop stalk guide attachment and thus above the predetermined elevation of the cutterbar and the front portion of the crop stalk guide attachment. Each of the rearward elongated passageways of the crop stalk guide attachment has a width less than the width of each of the forward elongated passageways of the crop stalk guide extension.

More particularly, the crop stalk guide attachment includes a support framework having a rear portion and a front portion and is attachable at the rear portion to a header cutterbar so as to extend at the front portion forwardly from below the sickle guards and sickle of the cutterbar, and a plurality of guide plates each having a front portion defining a leading end and attached on the front portion of the support framework so as to extend above the sickle guards and sickle of the cutterbar and being spaced laterally from one another so as to define rearward elongated passageways therebetween and running in the direction of forward travel and leading rearwardly between the sickle guards to the sickle of the cutterbar.

Further, the crop stalk guide extension includes a plurality of assembled units made up of mounting bars, guide bars and braces. Each mounting bar has a rearward section adapted to underlie and be attachable to the front portion of the support framework of the crop stalk guide attachment and a forward section having a leading end and being attached to and disposed downwardly in an offset relation to the rearward section and extending forwardly from the rearward section and forwardly from the front portion of the support framework and one of the guide plates of the crop stalk guide attachment.

Each guide bar has a forward end and a rearward end. The forward end overlies and is attached on the leading end of the forward section of one of the mounting bars. Each guide bar extends inclined upwardly and rearwardly from the forward end to the rearward end which overlies and is spaced above the leading end of the front portion of one of the guide plates of the crop stalk guide attachment. The guide bars and the mounting bars together define the forward elongated passageways running in the direction of forward travel across the field surface and leading rearwardly to the rearward elongated passageways for guiding crop stalks on the field surface to the crop stalk guide attachment.

The leading end of the forward section of each of the mounting bars and the forward end of each of the guide bars of the crop stalk guide extension have lateral edges which taper forwardly and toward one another and terminate at points so as to provide crop dividers for separating stalks in adjacent rows from one another. Each of the mounting bars and the guide bars have substantially the same width and thickness. Each mounting bar and guide bar has a width that is less than the width of each of the forward elongated passageways of the crop stalk guide extension. Each guide bar has a slick upper surface which is capable of providing a substantially smooth flow of crop stalks through the forward elongated passageways and of sweeping loose grain rearwardly and over the cutterbar along with the severed portions of the crop stalks.

Each brace has a lower end attached to the forward section of one of the mounting bars at a location spaced rearwardly from the leading end thereof and an upper end attached to one of the guide bars at a location between and spaced from the forward and rearward ends thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a fragmentary top plan view of a crop gathering header cutterbar with a crop stalk guide assembly having a crop stalk guide attachment and a crop stalk guide extension of the present invention applied thereto.

FIG. 2 is a longitudinal sectional view of the crop stalk guide attachment and crop stalk guide extension of the assembly taken along line 2—2 of FIG. 1.

FIG. 3 is a side elevational view of one of a plurality of assembled units of mounting bars, guide bars and braces making up the crop stalk guide extension of the assembly shown in FIG. 1.

FIG. 4 is a top plan view of a mounting bar and brace for one of the units making up the crop stalk guide extension.

DETAILED DESCRIPTION OF THE INVENTION

Figure 5:
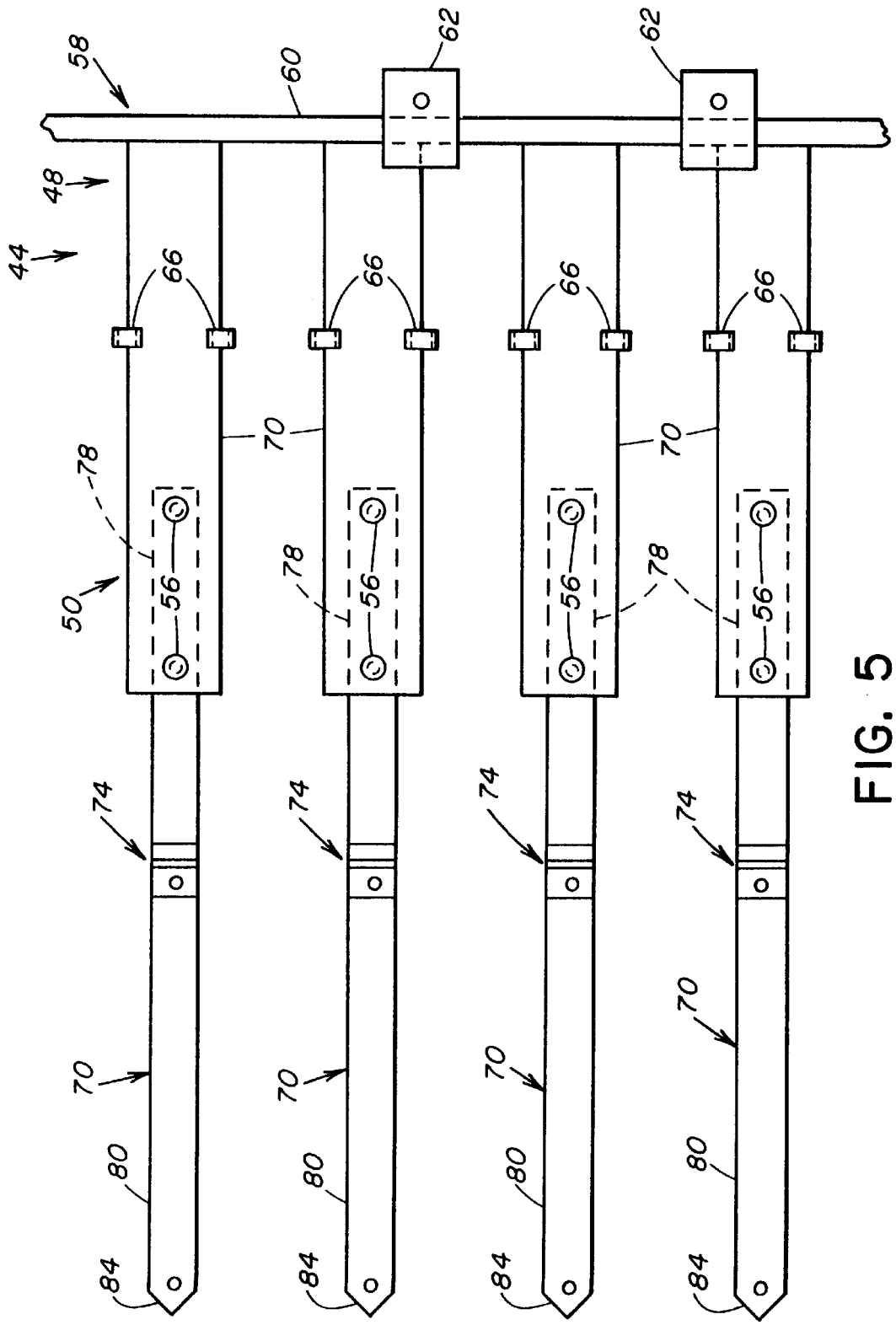
FIG. 5 is a top plan view of a support framework of the crop stalk guide attachment having mounting bars and braces of the crop stalk guide extension attached thereto.

Referring to the drawings and particularly to FIGS. 1 and 2, there is illustrated a crop stalk guide assembly, generally designated 10, of the present invention, for use on a crop gathering header cutterbar 12 which is disposed a predetermined elevation above a field surface. The crop gathering header cutterbar 12 includes a transverse support bar 14, a row of laterally-spaced forwardly-extending sickle guards 16 and a sickle 18 composed of a driven strip 20 and a row of blade sections 22 fasten in side-by-side relation along the driven strip 20 and reciprocally movable laterally through the sickle guards 16 and cooperable therewith to sever crop stalks (not shown) from the field surface F. The sickle guards 16 are attached by any suitable fasteners 24 to an underside of the support bar 14. The driven strip 20 of the sickle 18 is mounted along an aligned row of depressions 16A in the sickle guards 16 for reciprocal movement relative thereto by a conventional drive mechanism (not shown) connected to an end of the driven strip 20. As the driven strip 20 of the sickle 18 moves laterally relative to the sickle guards 16, blade sections 22 of the sickle 18 move in reciprocating fashion through slots 26 in the sickle guards 16. The moving blade sections 22 of the sickle 18 cooperate with stationary cutting edges 16B on the sickle guards 16 to sever the crop stalks.

Referring now to FIGS. 1–5, the crop stalk guide assembly 10 comprising the present invention basically includes the combination of the crop stalk guide attachment 28 as shown and described in the above-cited Britten patent with a crop stalk guide extension 30 therefor also comprising the present invention. The crop stalk guide attachment 28 has a rear portion 32 attachable to the header cutterbar 12 and a front portion 34 extending forwardly from the rear portion 32. The rear and front portions 32, 34 together define rearward elongated passageways 36 beginning forwardly of the cutterbar 12 at generally the same or nearly the same elevation as the predetermined elevation of the cutterbar 12 and running in the direction of forward travel across the field surface F and leading rearwardly to between the sickle guards 16 to the sickle 18 of the cutterbar 12. The crop stalk guide attachment 28 via the rearward passageways 36 thereof guide the rows of crop stalks (not shown) on the field surface F to the cutterbar 12 and terminate over the cutterbar 12 above the predetermined elevation thereof, as seen in FIG. 2.

The crop stalk guide extension 30 of the present invention has a rearward portion 38 attachable to the crop stalk guide attachment 28 and a forward portion 40 extending forwardly from the rearward portion 38 and below the crop stalk guide attachment 28. The rearward and forward portions 38, 40 together define forward elongated passageways 42 beginning forwardly of and below the crop stalk guide attachment 28 at an elevation below the predetermined elevation of the cutterbar 12 and of the crop stalk guide attachment 28 and adjacent to the field surface F and running in the direction of forward travel across the field surface F. The forward passageways 42 lead rearwardly to and merge with the rearward elongated passageways 36 for guiding crop stalks on the field surface F to the crop stalk guide attachment 28. The forward passageways 42 terminate at an elevation above and over the front portion 34 of the crop stalk guide attachment 28 and thus above the predetermined elevation of the cutterbar 12. As best seen in FIG. 1, the forward passageways 42 each has a width greater than a width of the each of the rearward elongated passageways 36.

Referring to FIGS. 1, 2 and 5, the crop stalk guide attachment 28 basically includes a support framework 44 and a plurality of guide plates 46. The support framework 44 has a rear portion 48 and a front portion 50. The rear portion 48 is attachable to the header cutterbar 12 so as to extend at the front portion 50 forwardly from below the sickle guards 16 and sickle 18 of the cutterbar 12. Each guide plate 46 has a front portion 46A terminating in a leading end 54 and is attached by a fastener 56 on the front portion 50 of the support framework 44 so as to extend above the sickle guards 16 and sickle 18 of the cutterbar 12. The guide plates 46 are spaced laterally from one another so as to define the rearward passageways 36 therebetween running in the direction of forward travel and leading rearward between the sickle guards 16 to the sickle 18 of the cutterbar 12.

More particularly, the support framework 44 of the crop stalk guide attachment 28 includes a transversely-extending rigid mounting member 58 in the form of an elongated mounting bar 60 with spaced mounting tabs 62 by which the mounting bar 60 is attached to an underside of the sickle guards 16 and thereby to support bar 14. The support framework 44 also includes a plurality of flat support members 64 rigidly attached at their rear ends, such as by welding, to the mounting bar 60 and extending forwardly therefrom in laterally spaced relation to one another.

The support framework 44 further includes a plurality of hollow rings 66 arranged in spaced pairs and rigidly attached on top of each of the flat support members 64. The pairs of rings 66 are located about midway between front and rear ends of the flat support member 64 and are spaced forwardly from the mounting bar 60. The hollow rings 66 are positioned in alignment with the sickle guards 16 of the cutterbar 12 for receiving pointed forward tips 16C of the guards 16 through the hollow interiors of the rings 66.

Further, each guide plate 46 has front and rear portions 46A, 46B and a middle portion 46C extending between and rigidly connecting the front and rear portions 46A, 46B. The front, rear and middle portions 46A, 46B and 46C have different functions. More particularly, the spaces between respective lateral edges of the middle portions 46C of adjacent guide plates 46 define the rearward elongated passageways 36 which lead to the sickle 18. The lateral edges of the front portion 46A of each guide plate 46 is tapered forwardly and toward one another and terminates at a point 46D so as to provide a crop divider for separating the stalks of adjacent rows from one another.

The lateral edges of the rear portions 46B of the guide plates 46 are farther apart from one another than are the lateral edges of the middle portions 46C thereof so as to define opposite rear notches 68 which are vertically aligned with the cutting edges 16B of the adjacent sickle guards 16 located on opposite sides of the rearward elongated passageways 36. The rear notches 68 in the guide plates 46 provide sufficient clearance at the rear portions 46B of the guide plates 46 for the crop stalks to enter between the respective sickle blade sections 22 and sickle guards 16 for accomplishment of the severing of the stalks by the cutting action of the moving blade sections 22 against the stationary cutting edges 16B of the sickle guards 16.

Each guide plate 46 also has a generally arcuate shape along the longitudinal dimension or length thereof. The attachment of each guide plate 46 by the fasteners 56 to the flat support members 64 at the forward half of the guide plate 46 and the positioning of the rearward half of the guide plate 46 over hollow rings 66 on flat support members 64 produces a bend in the guide plate 46 which is approximately halfway between its opposite ends and this way gives the guide plate 46 its generally arcuate shape. Thus, the rearward half of the guide plate 46 is more inclined relative to the horizontal than the forward half thereof.

Also, the guide plates 46 have slick upper surfaces. The slick surfaces promote the smooth flow of crop stalks through the rearward elongated passageways 36 between the guide plates 46. The slick surfaces also promote sweeping of loose grain which has fallen on the guide plates 46 rearwardly along the upper surfaces of the guide plates 46 and over the cutterbar 12 with the severed crop stalks so as to reduce grain losses. The desired slickness of the guide plate 46 top surface can be supplied by use of a suitable plastic material or, alternatively, by polishing the surface of a guide plate composed of metal.

Referring now to FIGS. 1–5, the crop stalk guide extension 30 of the present invention includes pluralities of mounting bars 70, guide bars 72 and braces 74. More particularly, the crop stalk guide extension 30 is made up of a plurality of assembled units 76 (only one of which is seen in FIG. 3) which are mounted to the flat support members 64 of the support framework 44 of the crop stalk guide attachment 28 in fore and aft alignment with the flat support members 64 and the guide plates 46 of the crop stalk guide attachment 28. Each assembled unit 76 is formed by one of the mounting bars 70, one of the guide bars 72 and one of the braces 74. Each mounting bar 70 has a rearward section 78, a forward section 80 and an intermediate section 82 extending therebetween and interconnecting the rearward and forward sections 78, 80 in an offset vertically step-like relationship wherein the forward section 80 is at a lower elevation that the rearward section 78. The higher rearward section 78 is adapted to underlie and attached to the front portion 50 of the support framework 44 of the crop stalk guide attachment 28 with the same fasteners 56 used to attach the front portion 52 of the guide plate 46 to the front portion 50 of the support framework 44. The lower forward section 80 has a leading end 84 and is attached to and disposed downwardly in an offset relation to the rearward section 76 by the forwardly and downwardly inclined intermediate section 82. The forward section 80 extends forwardly from the rearward section 78 and thus forwardly from the front portion 50 of the support framework 44 and the corresponding one of the guide plates 46 of the crop stalk guide attachment 28. The forward section 80 has a length greater than that of the rearward section 78 and intermediate section 82.

Each guide bar 72 has a forward end 86 and a rearward end 88. The forward end 86 overlies and is attached on the leading end 84 of the forward section 80 of the corresponding one of the mounting bars 70. Suitable fasteners 90 are provided for attaching the guide bar forward ends 86 upon the mounting bar forward section leading ends 84. Each guide bar 72 extends inclined upwardly and rearwardly from its forward end 86 to its rearward end 88 where it overlies and is spaced above the leading end 54 of the front portion 52 of a corresponding one of the guide plates 46 of the crop stalk guide attachment 28.

The guide bars 72 and the mounting bars 70 of the assembled units 76 together define the aforementioned forward passageways 42 running in the direction of forward travel across the field surface F which are aligned with and lead rearwardly to the rearward passageways 36 for guiding crop stalks on the field surface to the crop stalk guide attachment 28. The forward ends 86 of the guide bars 72 have pointed configurations that overlie and match in profile the pointed configurations of the leading ends 84 of the forward sections 80 of the mounting bars 70 so that together the forward ends 86 and leading ends 84 provide crop dividers for separating stalks in adjacent rows from one another. Each of the mounting bars 70 and the guide bars 72 of the assembled units 76 have generally the same width and thickness. Also, each guide bar 72 has a length similar to that of the forward section 80 of a given one of the mounting bars 70. The widths of the mounting bars 70 and guide bars 72 are substantially less than the widths of the forward passageways 42 of the crop stalk guide extension 30 and the widths of the guide plates 46 of the crop stalk guide attachment 28 but greater than the widths of the rearward passageways 36 thereof. As in the case of the guide plates 46 of the crop stalk guide attachment 28, each of the guide bars 72 of the crop stalk guide extension 30 has a slick upper surface capable of providing substantially smooth flow of crop stalks through the forward passageways 42 and of sweeping loose grain rearwardly on the guide bars 72 and over and to the guide plates 46 along with the crop stalks.

Each brace 74 has a lower end 92 attached to the forward section 80 of one of the mounting bars 70 at a location spaced rearwardly from the leading end 84 thereof and an upper end 94 attached to one of the guide bars 72 at a location between and spaced from the forward and rearward ends 86, 88 thereof. The upper end 94 of each brace 74 is bent to form a mounting tab 96 giving each brace 74 a substantially inverted L-shaped configuration. The upper end 94 is attached to a corresponding one guide bar 72 of each assembled unit 76 at the mounting tab 96 by any suitable fastener 98. This attachment occurs closer to the rearward end 88 than to the forward end 86 of the guide bar 72. The lower end 92 is attached to the forward section 80 of a corresponding one mounting bar 70 of each assembled unit 76 by welding or any other suitable means.

From the above description, it will be readily understood that the crop stalk guide extension 30 when attached on the crop stalk guide attachment 28 of the Britten patent allows the header of a crop harvester to work lower to the field surface and thereby to move across the field surface and slide under flattened crop stalks and raise them so that they will be positioned to be engaged and guided by the crop stalk guide attachment 28 into the header cutterbar 12. The crop stalk guide extension 30 need not be used in normal crop conditions, being primarily intended for use in extreme conditions wherein crop stalks are too low to the ground to be engaged and guided the crop stalk guide attachment 28 alone.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A crop stalk guide assembly for use on a crop gathering header cutterbar disposed a predetermined elevation above a field surface and having a row of laterally-spaced forwardly-extending sickle guards and a sickle composed of a row of blade sections reciprocally movable laterally through the sickle guards and cooperable therewith to sever crop stalks from the field surface, said crop stalk guide assembly comprising:

(a) a crop stalk guide attachment having a rear portion attachable to the header cutterbar and a front portion extending forwardly from said rear portion, said rear and front portions together defining a plurality of laterally-spaced elongated rearward passageways beginning forwardly of the cutterbar at generally the predetermined elevation of the cutterbar and running in the direction of forward travel across the field surface and leading rearwardly to between the sickle guards to the sickle of the cutterbar for guiding crop stalks on the field surface to the cutterbar and terminating over the cutterbar above the predetermined elevation thereof; and (b) a crop stalk guide extension having a rearward portion attachable to said crop stalk guide attachment and a forward portion extending forwardly from said rearward portion and below said crop stalk guide attachment, said rearward and forward portions together defining a plurality of laterally-spaced elongated forward passageways beginning forwardly of and below said crop stalk guide attachment at an elevation below the predetermined elevation of the cutterbar and said crop stalk guide attachment and adjacent to the field surface and running in the direction of forward travel across the field surface and aligned with and leading rearwardly to said rearward passageways for guiding crop stalks on the field surface to said crop stalk guide attachment and terminating at an elevation above and over said front portion of said crop stalk guide attachment and thus above the predetermined elevation of the cutterbar and said front portion of said crop stalk guide attachment.

2. The assembly of claim 1 wherein each of said rearward passageways of said crop stalk guide attachment has a width and each of said forward passageways of said crop stalk guide extension has a width greater than said width of said each rearward passageway.

3. The assembly of claim 1 wherein said crop stalk guide extension is comprised of a plurality of assembled units each having a mounting bar which includes:

a rearward section adapted to underlie and being attachable to said forward portion of said crop stalk guide attachment; and a forward section having a leading end and being attached to and disposed downwardly in an offset relation to said rearward section and extending forwardly from said rearward section and forwardly from said front portion of said crop stalk guide attachment.

4. The assembly of claim 3 wherein each of said assembled units of said crop stalk guide extension further has a guide bar having a forward end and a rearward end, said forward end overlying and attached on said leading end of said forward section of said mounting bar, said guide bar extending inclined upwardly and rearwardly from said forward end to said rearward end which overlies and is spaced above said front portion of said crop stalk guide attachment, said guide bar and said mounting bar together defining one of said forward passageways of said crop stalk guide extension running in the direction of forward travel across the field surface and aligned with and leading rearwardly to one of said rearward passageways of said crop stalk guide attachment for guiding crop stalks on the field surface to said crop stalk guide attachment.

5. The assembly of claim 4 wherein said leading end of said forward section of said mounting bar and said forward end of said guide bar of said crop stalk guide extension have matching pointed configurations providing crop dividers for separating stalks in adjacent rows from one another.

6. The assembly of claim 4 wherein said mounting bar and said guide bar of each of said assembled units of said crop stalk guide extension have substantially the same width and thickness.

7. The assembly of claim 4 wherein said mounting bar and said guide bar of each of said assembled units of said crop stalk guide extension have respective widths and each of said forward passageways of said crop stalk guide extension has a width greater than said respective widths of said mounting bar and said guide bar of said each assembled unit of said crop stalk guide extension.

8. The assembly of claim 4 wherein said guide bar of each assembled unit has a slick upper surface capable of providing a substantially smooth flow of crop stalks through said forward passageways and of sweeping loose grain rearwardly and over onto said crop stalk guide attachment.

9. The assembly of claim 4 wherein each of said assembled units of said crop stalk guide extension further includes a brace supporting said guide bar upwardly and rearwardly inclined to said mounting bar, said brace having a lower end attached to said forward section of said mounting bar at a location spaced rearwardly from said leading end thereof and an upper end attached to said guide bar at a location between and spaced from said forward and rearward ends thereof.

10. A crop stalk guide assembly for use on a crop gathering header cutterbar disposed a predetermined elevation above a field surface and having a row of laterally-spaced forwardly-extending sickle guards and a sickle composed of a row of blade sections reciprocally movable laterally through the sickle guards and cooperable therewith to sever crop stalks, said crop stalk guide assembly comprising:

(a) a crop stalk guide attachment for guiding crop stalks at an upper elevation into the cutterbar, said crop stalk guide attachment including
  (i) a support framework having a rear portion and a front portion and being attachable at said rear portion to a header cutterbar so as to extend at said front portion forwardly from below the sickle guards and sickle of the cutterbar, and
  (ii) a plurality of guide plates each having a front portion defining a leading end and being attached on said front portion of said support framework so as to extend above the sickle guards and sickle of the cutterbar and being spaced laterally from one another so as to define a plurality of laterally-spaced elongated rearward passageways therebetween running in the direction of forward travel and leading rearwardly between the sickle guards to the sickle of the cutterbar; and (b) a crop stalk guide extension for guiding crop stalks rearwardly to said crop stalk guide attachment from a lower elevation below said upper elevation of said crop stalk guide attachment and adjacent to the field surface, crop stalk guide extension comprised of a plurality of assembled units each including
  (i) a mounting bar having a rearward section and a forward section, said rearward section adapted to underlie and being attachable to said front portion of said support framework of said crop stalk guide attachment, said forward section having a leading end and being attached to and disposed downwardly in an offset relation to said rearward section and extending forwardly from said rearward section and forwardly from said front portion of said support framework and one of said guide plates of said crop stalk guide attachment,
  (ii) a guide bar having a forward end and a rearward end, said forward end overlying and attached on said leading end of said forward section of said mounting bar, said guide bars extending inclined upwardly and rearwardly from said forward end to said rearward end overlying and spaced above said leading end of said front portion of one of said guide plates of said crop stalk guide attachment, said guide bars and said mounting bars of said assembled units together defining a plurality of laterally-spaced elongated forward passageways running in the direction of forward travel across the field surface and leading rearwardly to said rearward passageways of said crop stalk guide attachment for guiding crop stalks on the field surface to said crop stalk guide attachment, and
  (iii) a brace supporting said guide bar upwardly and rearwardly inclined to said mounting bar, said brace having a lower end attached to said forward section of said mounting bar at a location spaced rearwardly from said leading end thereof and an upper end attached to said guide bar at a location between and spaced from said forward and rearward ends thereof.

11. The assembly of claim 10 wherein each of said rearward passageways of said crop stalk guide attachment has a width and each of said forward passageways of said crop stalk guide extension has a width greater than said width of said each rearward passageway.

12. The assembly of claim 10 wherein said leading end of said forward section of said mounting bar and said forward end of said guide bar of each of said assembled units of said crop stalk guide extension have matching pointed configurations providing crop dividers for separating stalks in adjacent rows from one another.

13. The assembly of claim 10 wherein said mounting bar and said guide bar of each of said assembled units of said crop stalk guide extension have substantially the same width and thickness.

14. The assembly of claim 10 wherein said mounting bar and said guide bar of each of said assembled units of said crop stalk guide extension have respective widths and each of said forward passageways of said crop stalk guide extension has a width greater than said respective widths of said mounting bars and said guide bars of said each assembled unit of said crop stalk guide extension.

15. The assembly of claim 10 wherein said guide bar of each assembled unit has a slick upper surface capable of providing a substantially smooth flow of crop stalks through said forward passageways and of sweeping loose grain rearwardly and over onto said crop stalk guide attachment.

16. A crop stalk guide extension for use on a crop stalk guide attachment to a crop gathering header cutterbar, said crop stalk guide extension comprised of a plurality of assembled units, each of said assembled units comprising:

(a) a mounting bar having a rearward section and a forward section, said rearward section adapted to underlie and being attachable to a front portion of a support framework of the crop stalk guide attachment, said forward section having a leading end and being attached to and disposed downwardly in an offset relation to said rearward section and extending forwardly from said rearward section and forwardly from the front portion of the support framework and one of a plurality of guide plates of the crop stalk guide attachment;

(b) a guide bar having a forward end and a rearward end, said forward end overlying and attached on said leading end of said forward section of said mounting bar, said guide bar extending inclined upwardly and rearwardly from said forward end to said rearward end overlying and spaced above a leading end of a front portion of one of the guide plates of the crop stalk guide attachment, said guide bars and said mounting bars of said assembled units together defining a plurality of laterally-spaced elongated forward passageways running in the direction of forward travel across the field surface and leading rearwardly to laterally-spaced elongated rearward passageways of the crop stalk guide attachment for guiding crop stalks on the field surface to the crop stalk guide attachment, said leading end of said forward section of said mounting bar and said forward end of said guide bar of said crop stalk guide extension having substantially the same width and matching pointed configurations providing crop dividers for separating stalks in adjacent rows from one another; and (c) a brace supporting said guide bar upwardly and rearwardly inclined to said mounting bar, said brace having a lower end attached to said forward section of said mounting bar at a location spaced rearwardly from said leading end thereof and an upper end attached to said guide bar at a location between and spaced from said forward and rearward ends thereof.

17. The extension of claim 16 wherein said leading end of said forward section of said mounting bar and said forward end of said guide bar of each of said assembled units of said crop stalk guide extension have matching pointed configurations providing crop dividers for separating stalks in adjacent rows from one another.

18. The extension of claim 16 wherein said mounting bar and said guide bar of each of said assembled units of said crop stalk guide extension have substantially the same width and thickness.

19. The extension of claim 16 wherein said mounting bar and said guide bar of each of said assembled units of said crop stalk guide extension have respective widths and each of said forward passageways of said crop stalk guide extension has a width greater than said respective widths of said mounting bars and said guide bars of said each assembled unit of said crop stalk guide extension.

20. The extension of claim 16 wherein said guide bar of each assembled unit has a slick upper surface capable of providing a substantially smooth flow of crop stalks through said forward passageways and of sweeping loose grain rearwardly and over onto said crop stalk guide attachment.

* * * * *